(12) United States Patent
Vierthaler et al.

(10) Patent No.: US 6,281,813 B1
(45) Date of Patent: Aug. 28, 2001

(54) CIRCUIT FOR DECODING AN ANALOG AUDIO SIGNAL

(75) Inventors: Matthias Vierthaler, Freiburg; Martin Winterer, Gundelfingen; Stefan Mueller, Freiburg; Thomas Hilpert, Denzlingen; Carsten Noeske, Freiburg, all of (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 09/349,594

(22) Filed: Jul. 9, 1999

(51) Int. Cl.$^7$ ................ H04N 5/60; H04H 5/00
(52) U.S. Cl. ................ 341/50; 348/738; 381/2
(58) Field of Search .............. 341/50; 348/738; 381/2, 3, 22, 7, 294

(56) References Cited

U.S. PATENT DOCUMENTS 4,472,830 * 9/1984 Nagai ........................ 381/2
5,357,284 * 10/1994 Todd ......................... 348/486

FOREIGN PATENT DOCUMENTS

363296418 * 12/1988 (JP) ........................ 375/316

* cited by examiner

Primary Examiner—Michael Tokar
Assistant Examiner—Daniel D. Chang
(74) Attorney, Agent, or Firm—Samuels, Gauthier & Stevens, LLP

(57) ABSTRACT

An integrated circuit for decoding an analog audio signal includes a tuner that receives the analog audio signal and provides a sound intercarrier frequency signal. A digital demodulator receives and digitizes the sound intercarrier frequency signal to provide a digitized sound intercarrier frequency signal, and digitally demodulates the digitized sound intercarrier frequency signal to provide a digitized multichannel television sound (MTS) demodulated signal. A digital broadcast television system committee (BTSC) compatible decoder receives and decodes the digitized multichannel television sound (MTS) demodulated signal, and provides a summed (L+R) audio output signal and a difference (L−R) audio output signal.

6 Claims, 1 Drawing Sheet

CIRCUIT FOR DECODING AN ANALOG AUDIO SIGNAL

BACKGROUND OF THE INVENTION

The invention relates to a method and a circuit for decoding a Sound Intercarrier Frequency (SIF) signal using the frequency (SIF) BTSC standard.

In the United States, stereo sound in television and video is transmitted and processed using the BTSC standard established by the Broadcast Television System Committee (BTSC). This standard is also known as Multichannel Television Sound, (MTS).

According to the BTSC standard, the sum R+L and the difference L−R of the signal R of the right stereo channel and the signal L of the left stereo channel are formed at the transmitter. The sum signal and the difference signal are further processed and encoded into separate branches so that an encoded sum signal and an encoded difference signal are formed that are decoded again at the receiver in order to obtain a stereo audio signal.

The sum signal R+L, the amplitude-modulated difference signal L−R, a pilot signal, the frequency-modulated Second Audio Program, (SAP) and the frequency-modulated professional channel are combined into the MTS signal At the transmitter, a BTSC encoder encodes a multiplex signal that has been compressed using the DBX noise suppression described in U.S. Pat. No. 4,539,526.

According to the BTSC standard, the difference signal L−R is amplitude-modulated with twice the video line frequency. Because of the parabolic noise distribution in the transmission of frequency-modulated signals, the noise level in the transmission channel on which the difference signal L−R is transmitted is approximately 15 dB higher than in the transmission channel on which the sum signal L+R is transmitted, although the difference signal L−R is modulated by 6 dB more than the sum signal. For this reason, a dynamic noise suppression system is provided for the channel to transmit the difference signal L−R, (e.g., the above mentioned DBX noise suppression system). However, because a DBX noise suppression system is provided in only one channel, (i.e., the channel for transmission of the difference signal), it must meet strict requirements regarding accuracy and scaling. Even small inaccuracies result in a deteriorated separation of the stereo sound. In order to avoid these disadvantages, a noise suppression system of this kind would be required in both channels, because the errors in dematricization are compensated and therefore act only on the frequency response. Because of the high expense, however, a second noise suppression system is not used.

The basic principle of the DBX noise suppression system is the so-called masking. If a signal level in one spectral range is much greater than the noise level in this range, a listener will not notice the noise in this range. In order to make the noise inaudible, the DBX noise suppression system encodes the signal so that the signal level of the transmitted signal is much greater than the noise level of the transmission channel. In the DBX noise suppression system, the audio signal to be transmitted in various spectral ranges is compressed so that the level of the transmitted signal is sufficiently high relative to the noise level and the signal energy is distributed as uniformly as possible over the entire frequency range of the signal.

In order to be able to meet both requirements, a DBX encoder described in the above mentioned U.S. Pat. No. 4,539,526 is equipped with first and second compression stages.

In the first compression stage, a variable pre-emphasis filter amplifies the high-frequency signal component as a function of the energy in this spectrum in order thus to achieve a distribution of the signal energy over the entire frequency spectrum that is as uniform as possible. The variable pre-emphasis filter is controlled by a control variable obtained by feeding its output signal back through a high-pass.

In the second stage, the level of the signal is raised or lowered as a function of the total energy by a compressor, which includes a controllable amplifier whose control signal is derived from the output signal of the variable pre-emphasis filter by a bandpass.

The control signal for the variable pre-emphasis filter is derived from the high-frequency components, while the control signal for the controllable amplifier is derived from the entire spectrum.

According to the BTSC standard, at the transmitter, a carrier with a frequency of 4.5 MHz is frequency-modulated with the MTS signal, which must be adjusted precisely to a specific level that always relates to a certain frequency modulation deviation. The modulated MTS signal is the Sound Intercarrier Frequency (SIF) signal. Thus for example it is defined that the bandpass of the encoder has an amplification of 0 dB when a signal with a frequency of 300 Hz is applied at the input which has modulated the carrier with a deviation of 4.495 kHz. Known analog frequency modulation demodulators supply an output voltage that is proportional to the frequency of the frequency-modulated input signal. However, the voltage of the frequency modulation demodulator is also proportionally dependent on an unknown factor which varies as a result of internal component tolerances and is subject to drift as a result of temperature changes and component aging. Since no known relationship exists for this reason between the frequency modulation deviation and the output voltage of the frequency modulation demodulator, the input level for each module must be very accurately adjusted by a potentiometer for example. As a result of the above mentioned drift caused by component aging, an adjustment must be made after a few years in order to achieve good stereo reproduction once again.

SUMMARY OF THE INVENTION

Hence the goal of the invention is to design a method and a circuit for decoding an analog audio signal according to the BTSC standard in such fashion that all the adjustments, both adjustment during manufacture and also subsequent adjustment caused by drift due to component aging, become superfluous.

The invention achieves this goal according to the method by the fact that initially a digital SIF signal is provided in a first step, is demodulated in a second step to produce the digital MTS signal, and that the digital MTS signal is decoded in a third step using a digital BTSC decoder.

The invention achieves this goal devicewise by the fact that a digital SIF signal is applied at the input of a digital frequency modulation demodulator whose output is connected with the input of a digital BTSC decoder, at whose outputs the sum signal R+L and the difference signal L−R can be obtained.

DETAILED DESCRIPTION OF THE INVENTION

Figure 2:
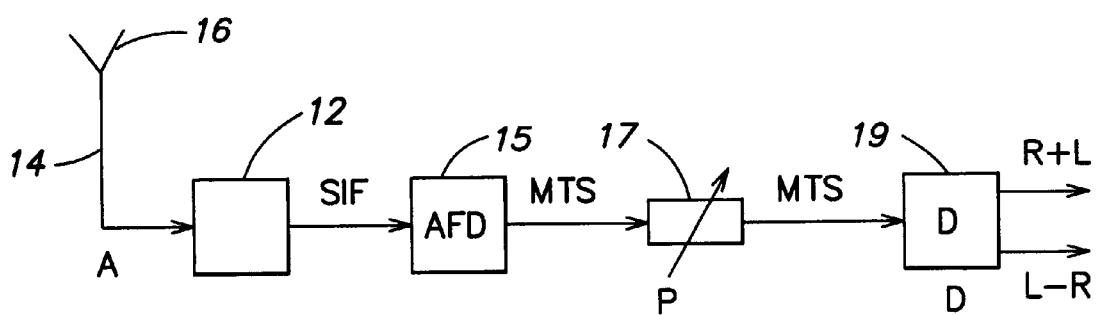
FIG. 2 shows a circuit according to the prior art.

In FIG. 2, a tuner 12 receives a signal on a line 14 from an antenna 16. The signal on the line 14 is a Sound Intercarrier Frequency (SFI) signal. The SIF signal is a carrier at 4.5 MHz frequency-modulated with the MTS signal. The MTS signal includes of the following components: the sum signal R+L, a pilot signal, the amplitude-modulated difference signal L–R, the frequency-modulated Second Audio Program, (SAP), and a frequency-modulated professional channel. The output signal SIF of the tuner 12 is demodulated in an analog frequency modulation demodulator AFD 15 whose output signal, the MTS signal, is supplied through an equalizing device (e.g., a potentiometer 17), to an analog BTSC decoder 19, at whose outputs the sum signal R+L and the difference signal L–R can be obtained. Each device is adjusted using potentiometer 17.

The invention will now be explained with reference to the embodiment shown in FIG. 1, which illustrates a decoder circuit 18.

The decoder circuit 18 includes a tuner 20 that receives a signal on line 22 from an antenna 24. The output of the tuner 20 is provided to a digital frequency modulation demodulator (DFD) 26 whose output is connected with a digital BTSC decoder 28 that provides the sum signal R+L and the difference signal L–R. The digital frequency modulation demodulator 28 includes an analog/digital converter 30 and a processor 32 connected in series therewith.

The output signal of tuner is initially converted in the digital frequency modulation demodulator 26 by the analog/digital converter 30 into a digital SIF signal, from which the processor PO, using the reversing function of the frequency modulation modulator at the transmitter, calculates the MTS signal DS in digital form. Components of the MTS signal on line 36 include the sum signal R+L and the amplitude-modulated difference signal L–R. Following digital demodulation, there are clearly defined amplitude ratios in the digital demodulated MTS signal DS. In the digital BTSC decoder 28, the digital MTS signal on the line 36 is broken up into its components, the sum signal R+L and, by amplitude demodulation, the difference signal L–R. The function of a digital requency modulation demodulator is known.

The function SIF of the modulator is as follows:

$$SIF = a0 * \cos(w0 * t + dOmega * \text{Integral}(0, t)(v(k) * dk))$$

with w0=4.5 MHz/2/Pi,
with dOmega=deviation
with v(k)=function to be transmitted, in this case the MTS signal
and with a0=amplitude of SIF The MTS signal is calculated by calculating the reversing function of the above function from the digitized SIF signal.

The difference signal L–R is calculated by the function of the DBX expander, while the sum signal R+L is calculated by a fixed deemphasis.

Significantly, part tolerances or drift caused by aging or temperature variations are no longer involved in the method according to the invention, since a specific frequency modulation deviation always leads to a precisely defined digital amplitude. The digital MTS signal on the line 36 at the output of the digital frequency modulation demodulator DFD is supplied directly to the digital BTSC decoder 28. Because both the digital frequency modulation demodulator 26 and the digital BTSC decoder 28 are digital components, exact level ratios exist between them, independently of the external wiring. Compensation is therefore no longer necessary. Advantageously, the digital frequency modulation demodulator and the digital BTSC decoder can be made as an integrated circuit.

The invention is suitable for television receivers and video recorders that process video signals according to the BTSC standard. In contrast to the prior art, all adjustments are eliminated, resulting in faster and less expensive production. In addition, no readjustments due to drift as a result of component aging are any longer necessary. The invention combines in a surprising fashion the advantage of faster and more economical manufacturing with a higher product quality.

Figure 1:
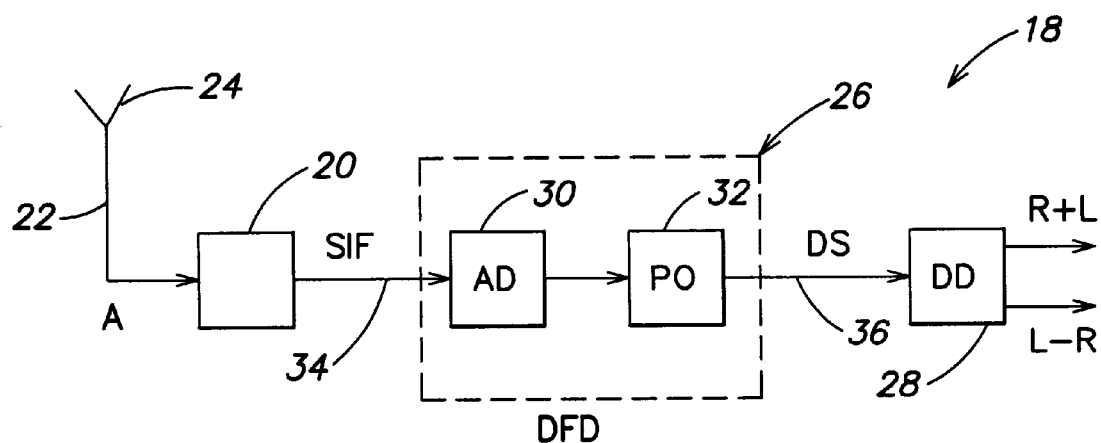
FIG. 1 shows an embodiment of the invention.

Within the scope of the present invention and in conjunction with FIG. 1, it was described that an analog SIF signal SIF is provided at the output of tuner T and this SIF signal SIF is then digitized in the digital frequency modulation demodulator DFD. However, the invention also includes the concept that the video signal is present in digital form or is digitized and the digital SIP signal SIF is obtained from this digital signal mixture.

LIST OF REFERENCES

A output signal of an antenna
T tuner
AFD analog frequency modulation demodulator
P potentiometer
D analog btsc decoder
DFD digital frequency modulation demodulator
AD analog/digital converter
PO processor
DS digital mts signal
DD digital btsc decoder
MTS analog mts signal
SIF SIF signal

What is claimed is:

1. An integrated circuit for decoding an analog audio signal, comprising:
   a tuner that receives the analog audio signal and provides a sound intercarrier frequency signal indicative thereof;
   a digital FM demodulator that receives and digitizes said sound intercarrier frequency signal to provide a digitized sound intercarrier frequency signal, and digitally demodulates said digitized sound intercarrier frequency signal to provide a digitized multichannel television sound (MTS) demodulated signal; and
   a digital broadcast television system committee (BTSC) compatible decoder that receives and decodes said digitized multichannel television sound (MTS) demodulated signal, and provides a summed (L+R) audio output signal and a difference (L–R) audio output signal.

2. The integrated circuit of claim 1, wherein said digital FM demodulator comprises:
   an analog-to-digital converter that digitizes said sound intercarrier frequency signal to provide said digitized sound intercarrier frequency signal; and
   a processor that receives said digitized sound intercarrier frequency signal and demodulates said digitized sound intercarrier frequency signal to provide said digitized multichannel television sound (MTS) demodulated signal.

3. The integrated circuit of claim 1, wherein said digital FM demodulator comprises:
   means for digitizing said sound intercarrier frequency signal to provide said digitized sound intercarrier frequency signal; and processing means responsive to said digitized sound intercarrier frequency signal, for demodulating said digitized sound intercarrier frequency signal to provide said digitized multichannel television sound (MTS) demodulated signal.

4. An integrated circuit for use in a television receiver to decode an analog audio signal, comprising:

a tuner that receives the analog audio signal and provides a sound intercarrier frequency signal indicative thereof;

means for digitally demodulating said sound intercarrier frequency signal to provide a digitized multichannel television sound (MTS) demodulated signal indicative thereof; and a digital broadcast television system committee (BTSC) compatible decoder that receives and decodes said digitized multichannel television sound (MTS) demodulated signal, and provides a summed (L+R) audio output signal and a difference (L–R) audio output signal.

5. The integrated circuit of claim 4, wherein said means for digitally demodulating comprises:

means for digitizing said sound intercarrier frequency signal to provide a digitized sound intercarrier frequency signal; and processing means responsive to said digitized sound intercarrier frequency signal, for demodulating said digitized sound intercarrier frequency signal to provide said digitized multichannel television sound (MTS) demodulated signal.

6. A circuit for decoding an analog audio signal, comprising:

a tuner that receives the analog audio signal and provides a sound intercarrier frequency signal indicative thereof;

a digital demodulator that includes (i) an analog-to-digital converter that digitizes said sound intercarrier frequency signal to provide a digitized sound intercarrier frequency signal, and (ii) a processor that receives said digitized sound intercarrier frequency signal and demodulates said digitized sound intercarrier frequency signal to provide said digitized multichannel television sound (MTS) demodulated signal; and a digital broadcast television system committee (BTSC) compatible decoder that receives and decodes said digitized multichannel television sound (MTS) demodulated signal, and provides a summed (L+R) audio output signal and a difference (L–R) audio output signal.

* * * * *

UNITED STATES PATENT AND TRADEMARK OFFICE
CERTIFICATE OF CORRECTION

PATENT NO. : 6,281,813 B1
DATED : August 28, 2001
INVENTOR(S) : Vierthaler et al.

It is certified that error appears in the above-identified patent and that said Letters Patent is hereby corrected as shown below:

Column 3,
Line 5, "(SFI)" should be -- (SIF) --.
Line 7, "includes of" should be -- includes --.
Line 13, delete "AFD".
Line 30, the first sentence should read:
-- The output signal of tuner 20 on line 34, (i.e., the SIF signal) is initially converted in the digital frequency modulation demodulator 26 by the analog/digital converter 30 into a digital SIF signal, from which the processor 32, using the reversing function of the frequency modulation modulator at the transmitter, calculates the MTS signal DS in digital form".

Column 4,
Line 16, "is provided at the output of tuner 20 and this SIF signal".
Line 17, delete "SIF".
Line 18, "DFD" should be "26".
Line 20, "digitized and the digital SIF signal on the line 34 is obtained from this".
Lines 22-35 should be deleted in their entirety.

Signed and Sealed this

Sixteenth Day of April, 2002

Attest:

JAMES E. ROGAN
*Attesting Officer*     *Director of the United States Patent and Trademark Office*